(12) United States Patent
Hill

(10) Patent No.: US 9,710,873 B1
(45) Date of Patent: Jul. 18, 2017

(54) POINT OF INTEREST MAPPING

(71) Applicant: Amazon Technologies, Inc., Reno, NV (US)

(72) Inventor: Peter J. Hill, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 253 days.

(21) Appl. No.: 13/662,309

(22) Filed: Oct. 26, 2012

(51) Int. Cl.
G06T 1/00 (2006.01)
G06T 1/20 (2006.01)

(52) U.S. Cl.
CPC ....................... *G06T 1/20* (2013.01)

(58) Field of Classification Search
None
See application file for complete search history.

(56) References Cited

U.S. PATENT DOCUMENTS

| | | | |
|---|---|---|---|
| 8,566,029 B1* | 10/2013 | Lopatenko et al. ......... | 701/426 |
| 2003/0036848 A1* | 2/2003 | Sheha ................ | G01C 21/3679 701/468 |
| 2007/0273558 A1* | 11/2007 | Smith ................. | G08G 1/0962 340/995.1 |
| 2009/0012955 A1* | 1/2009 | Chu et al. ......................... | 707/5 |
| 2009/0319181 A1* | 12/2009 | Khosravy .............. | G01C 21/20 701/532 |
| 2010/0082241 A1* | 4/2010 | Trivedi ......................... | 701/208 |
| 2010/0331016 A1 | 12/2010 | Dutton et al. | |
| 2012/0041672 A1 | 2/2012 | Curtis et al. | |
| 2012/0320089 A1* | 12/2012 | Kreft ............................. | 345/629 |
| 2013/0006522 A1* | 1/2013 | Vellaikal et al. ............ | 701/426 |
| 2013/0303192 A1 | 11/2013 | Louboutin et al. | |
| 2014/0040761 A1* | 2/2014 | Liu ................... | G06F 17/30241 715/747 |

OTHER PUBLICATIONS

Yahoo! TimeTraveler™. [online]. Yahoo! Inc., 2012 [retrieved on Dec. 13, 2012]. Retrieved from the Internet: <URL: http://travel.yahoo.com/timetraveler>.
Office action for U.S. Appl. 13/662,288 mailed on Aug. 24, 2015, Hill, "Points of Interest Recommendations", 6 pages.
Office Action for U.S. Appl. 13/662,288, mailed on Mar. 18, 2015, Peter J. Hill, "Points of Interest Recommendations", 12 pages.
Office action for U.S. Appl. 13/662,288, mailed on Oct. 3, 2014, Hill, "Points of Interest Recommendations", 11 pages.

\* cited by examiner

Primary Examiner — Barry Drennan
Assistant Examiner — Khoa Vu
(74) Attorney, Agent, or Firm — Lee & Hayes, PLLC

(57) ABSTRACT

Embodiments of the present disclosure are directed to, among other things, providing point of interest item recommendations and/or map information. In some examples, a profile for a first user may be determined based at least in part on point of interest information. Additionally, point of interest associations may be received from one or more of a group of users, where at least one of the group is not the first user. Based at least in part on the determined profile of the first user and the received point of interest associations, a map route and/or map information associated with a route from a first location to at least a second location may be generated.

24 Claims, 13 Drawing Sheets

POINT OF INTEREST MAPPING

CROSS REFERENCE TO RELATED APPLICATIONS

This application is related to application Ser. No. 13/662,288, filed on the same day herewith, entitled "POINTS OF INTEREST RECOMMENDATIONS," the entire contents of which is hereby incorporated by reference as if fully set forth herein, at least under 35 U.S.C. §120.

BACKGROUND

As more and more content becomes available over the Internet, exceedingly large numbers of users go to the web for all types of resources. For example, users may access the Internet for sources of entertainment, consumption of news items or other information, as well as for retrieving information associated with tourism and/or travel. Additionally, large numbers of users may rely on the review of web content for making decisions about items to purchase, places to visit, and/or activities in which to participate. As such, users have become accustomed to rating and/or reviewing items to help others make such decisions. However, such concepts may provide challenges for at least service providers that manage such content.

BRIEF DESCRIPTION OF THE DRAWINGS

Various embodiments in accordance with the present disclosure will be described with reference to the drawings, in which.

DETAILED DESCRIPTION

Figure 1:
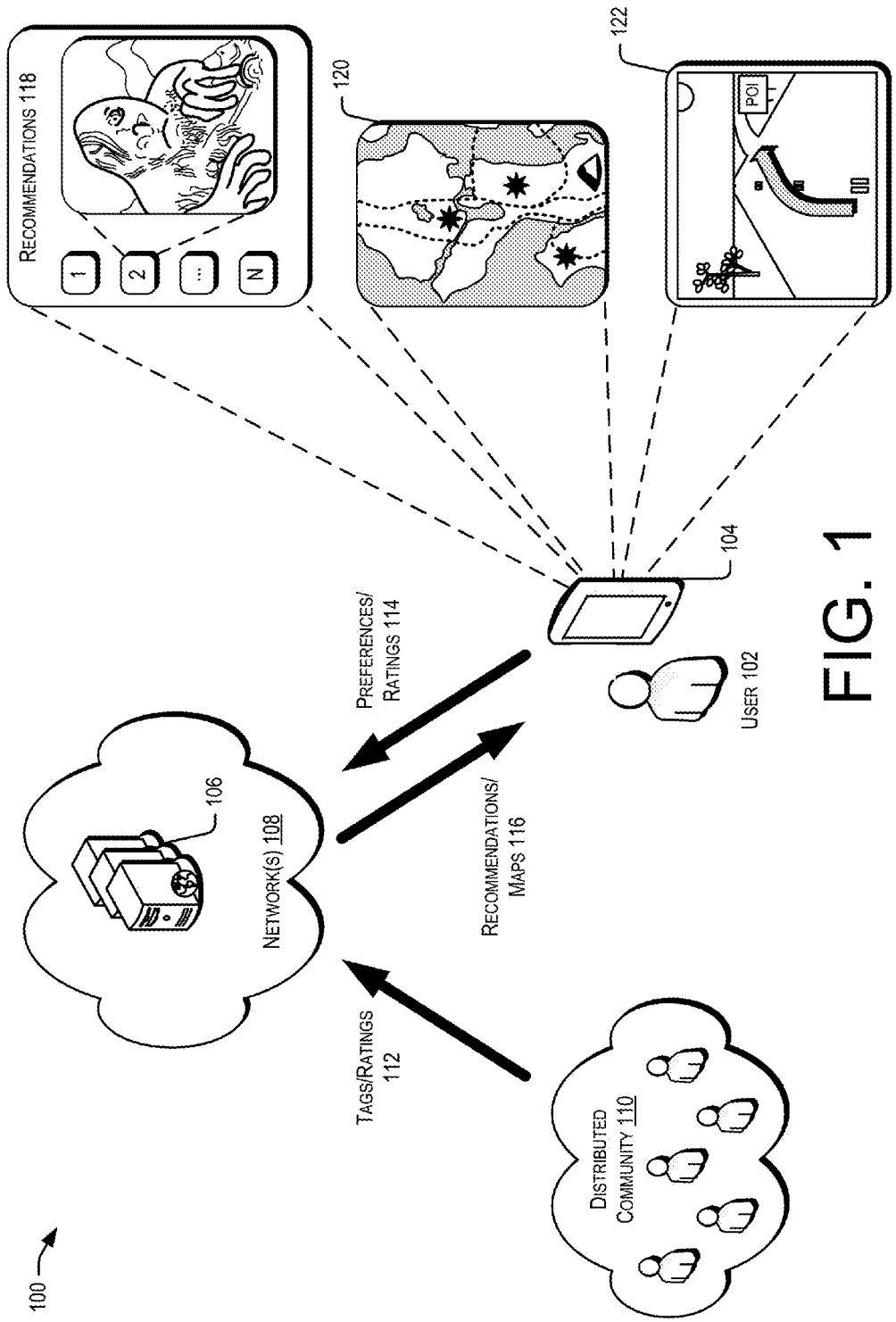
FIG. 1 illustrates an example architecture for providing points of interest recommendations and/or mapping, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing point of interest information including, but not limited to, point of interest items, point of interest locations, point of interest tags, etc., as well as providing point of interest recommendations and/or point of interest mapping. For example, point of interest items may include, but are not limited to, natural landmarks, man-made structures, and/or any physical location that may be of interest of someone. As such, point of interest information may be any information that can be utilized to describe such items (e.g., location, category, rating, review, etc.). Point of interest categories may include, without limitation, cool architecture, rooftop gardens, weird outdoor art, chocolate, old train stations, revolutionary war, or any category imaginable. Some items may fit into many different categories, and some categories may include many different items. In some examples, point of interest items as well as associated point of interest information may be managed in such a way that point of interest recommendations as well as point of interest map information may be generated and/or provided to users.

In some examples, a setup stage may include providing categories for a user to rank. These rankings may then be utilized to generate a user profile that indicates user preferences or otherwise enables more targeted recommendations and/or mapping. Once provided, recommendations may be filtered or sorted based on factors such as location, distance from the user, rating, etc. Additionally, the user profile may be further augmented or otherwise updated based at least in part on actions taken by the user. For example, when a user rates or ranks additional point of interest items, point of interest categories, and/or associations between items and categories (e.g., rating the accuracy of an item-category pair), the system may update the user's profile based at least in part on such ratings. Additionally, if a user visits a point of interest, this may indicate their actual preferences, rather than their intended preferences, and their profile may be updated accordingly. Time spent at a point of interest item may also be a factor as well as other information that may be useful in determining a user's preferences automatically.

Additionally, other users (and the initial user discussed) may be provided with an interface for rating point of interest items over time. For example, once a user has setup their preferences, they may be able to add new point of interest items to a catalogue of point of interest items. Additionally, users may be able to assign categories (also described herein as "tags") to individual point of interest items and/or create new tags. Once a tag is created, other users and the user that created the tag, may be able to rate the tag, add new point of interest items to the tag, rate the items associated with the tags, and/or rate the association between the tag and the item (e.g., a user may rate how much they like an item, how much they like a category, and/or how well they think an item fits in a category). Normalization may be utilized to avoid having too many different tags that are similar. For example, a user may be provided with similar options when they are creating a new tag (e.g., with predicative typing and/or collaborative filtering) or user-generated tags may be normalized on the back end such that all similar tags are grouped together and treated the same).

In some cases, based at least in part on a user profile, other user profiles, and/or the community-provided ratings (i.e., tag ratings, item ratings, and/or association ratings), point of interest recommendations and/or mapping information may be generated and/or provided to users. In some examples, a user may be automatically provided with point of interest recommendations or a user may request a point of interest recommendation. In either case, the recommendation may be based at least in part on their profile (i.e., their perceived or actual preferences) and the community rankings. For example, if a user has rated rooftop gardens as their favorite tag, and a rooftop garden on Fifth Avenue and Pike Street is rated by the community as the best, this rooftop garden may be recommended to the user. Additionally, other scenarios exist, where certain ratings (from users of the community) may be weighted higher based at least in part on factors such as similarity between the users (e.g., based at least in part on preferences), relationships between the users (e.g., based at least in part on social network information), familiarity of a particular location (e.g., the rater of an item from that city may be weighted higher than a rater who is not from that city), and/or actual visits (e.g., a rating from a user that has visited an item may be weighted higher than a rating from a user that has never visited the item). In some cases, verification that a user has visited an item may be made by geolocation information received from a mobile device and/or a photograph taken of the item (e.g., the picture may include geolocation metadata that may indicate that the picture was taken from a location associated with the item as opposed to copied from the Internet or the like).

Recommendations may be provided in a list or other representation via a graphical user interface (GUI). The list may rank or at least place the recommendations in an order that may be filtered, sorted, or otherwise reordered to the users liking. Pictures, tags, and/or other related data may be provided to the user with the recommendation, as well as links to web sites, location information, reviews, and/or other resources for providing information about the recommendations. In some examples, a score may be provided that indicates the strength of the recommendation with relation to the user's profile information. Additionally, information about other users that may have recommended the item, reviewed the item, and/or visited the item may be provided (if permission is given by those users or they were given the opportunity to opt-out of having their information shared). However, in some examples, this information may be provided in an anonymous fashion such as utilizing user names, aliases, or the like.

In some examples, maps and/or map information (i.e., map data points that can be provided to or otherwise utilized by a mapping application) may be provided that indicate point of interest recommendations and their physical relation to the user. The maps may include addresses of the point of interest items, routes to and from the point of interest items, as well as detours to one's current trip that may include visiting one or more point of interest items. For example, the features described herein may be integrated within a mobile global positioning service (GPS) application utilized for navigation. As such, a user may have requested directions from a current location to an address and a recommendation of a point of interest item may be provided that is on the route and/or matches a user preference. Additionally, the user may configure the application to recommend point of interest items on or near a route based at least in part on one or more of several factors. For example, factors may include an amount of detour time, a detour distance, a rating level, a number of reviews, a preference match score, one or more particular categories, or the like. Average (or other) amounts of time that users generally visit point of interest items may also be factored into the determination of whether to recommend the detour and/or whether the user has enough time to stop at the point of interest information. Additionally, in some examples, a route may be generated for visiting multiple point of interest items selected by and/or recommended for a user (or a group of users, e.g., based at least in part on a group profile). In this way, the mapping application may serve as a virtual tour guide for points of interest at or near a user's current location. GPS and/or other geolocation data may be received from a user's device and utilized for generating and/or providing the aforementioned point of interest recommendations and/or mapping.

FIG. 1 depicts an illustrative architecture with which techniques for providing point of interest recommendations and/or mapping may be implemented. These techniques are described in more detail below in connection with at least FIGS. 2-6. Returning to FIG. 1, the illustrative architecture 100 depicts at least one user 102 utilizing at least one user computing device 104 (e.g., a mobile phone, a tablet, a laptop or other personal computer, etc.) to interact with one or more point of interest management computers 106 via one or more networks 108. However, while the user device 104 is shown in FIG. 1 as a mobile device, any computing device with access to the networks 108 may be utilized, as desired. Additionally, the networks 108 may include any one or a combination of many different types of networks, such as cable networks, the Internet, wireless networks, cellular networks, as well as other private and/or public networks. While the illustrated example represents the users 102 accessing the point of interest computers 106 over the networks 108, the described techniques may equally apply in instances where the users 102 interact with a point of interest computers 106 via the one or more user devices 104 over a landline phone, via a kiosk, or in any other manner.

Additionally, a distributed community of other users 110 may also be in communication with the point of interest computers 106 via the one or more networks 108. In some aspects, the users of the distributed community 110 may also access the point of interest computers 106 via individual user devices such as, but not limited to, mobile devices or the like. Utilizing these user devices, each user of the distributed community 110 may individually provide point of interest item information to the point of interest computers 106, at 112. For example, as noted above, these users may create or point of interest tags, rate point of interest items, and/or associate point of interest items with point of interest tags. As desired, they may also rate each association, rate point of interest tags, provide reviews and/or photographs of items and/or tags, or the like.

As noted above, each user 104 (or the users of the distributed community 110) may also provide user preferences and/or ratings, at 114. For example, as part of a setup stage or initializing phase, the user 102 may rate or rank one or more pre-specified point of interest tags. These rankings may then be utilized by the point of interest computers 106 to generate a user profile for the user 102. Further, in some examples, the point of interest computers 106 may then determine one or more point of interest recommendations and/or maps based at least in part on the user profile and/or the community ratings. At 116, these recommendations and/or maps may be provided via the networks 108 to the user devices 104.

In some examples, the provided recommendations and/or maps may include, but are not limited to, point of interest recommendations 118, maps that include point of interest items 120, and/or routes to (or that include) point of interest items 122. For example, provided point of interest recommendations 118 may include 1-N recommendations in a list or other organizational structure (e.g., a tree, a row, a column, or other non-ranked or non-ordered grouping). As shown, the recommendations 118 may include a list of tags and/or a list of items that were determined as recommendations for the user 102. For example, #2 in the list may indicate that the tag "weird outdoor art" was ranked second for this user 102 based at least in part on their profile. By selecting #2 or hovering over the icon, an image (or other information) associated with the "Fremont Troll" may be displayed to the user 102. In some cases, the Fremont Troll may be the highest rated, most reviewed, or closest point of interest item in the "weird outdoor art" category or associated with the "weird outdoor art" tag. However, in other examples, the list may include a list of items (instead of tags) that were determined as recommendations for the user. In this case, the second item may be the second highest rated item (regardless of category or tag) determined as a recommendation for the user 102.

Further, in other examples, a map 120 may be provided that displays point of interest item recommendations that are near the user 102 or are at a search location requested by the user 102. For example, the user may set a proximity, location, and/or geofence for determining recommendations and/or maps. As such, a user 102 who does not live in Seattle, but is planning a trip there, may choose Seattle as the location and the map 120 may indicate recommended point of interest items in Seattle. Additionally, in some examples, a route 122 (or set of directions) may be provided to the user 102. The route may include directions to a point of interest item selected by the user 102, a point of interest item recommended to the user 102, or directions to an address of other location selected by the user. As such, the route 122 may include options for making deviations to the route in order to visit recommended and/or selected point of interest items. An interface that displays the route 122 may also be configured to periodically (or when appropriate) provide point of interest item recommendations to the user 102 while in route the destination selected by the user 102. For example, a prompt or pop-up window may indicate to the user 102 that if the user 102 were to exit shortly, he or she would be a certain distance away from a top rated point of interest item (based at least in part on the profile of the user 102 and/or the community 110 ratings) or a point of interest item associated with a top rated tag (based at least in part on the profile of the user 102 and/or the community 110 ratings).

Figure 2:
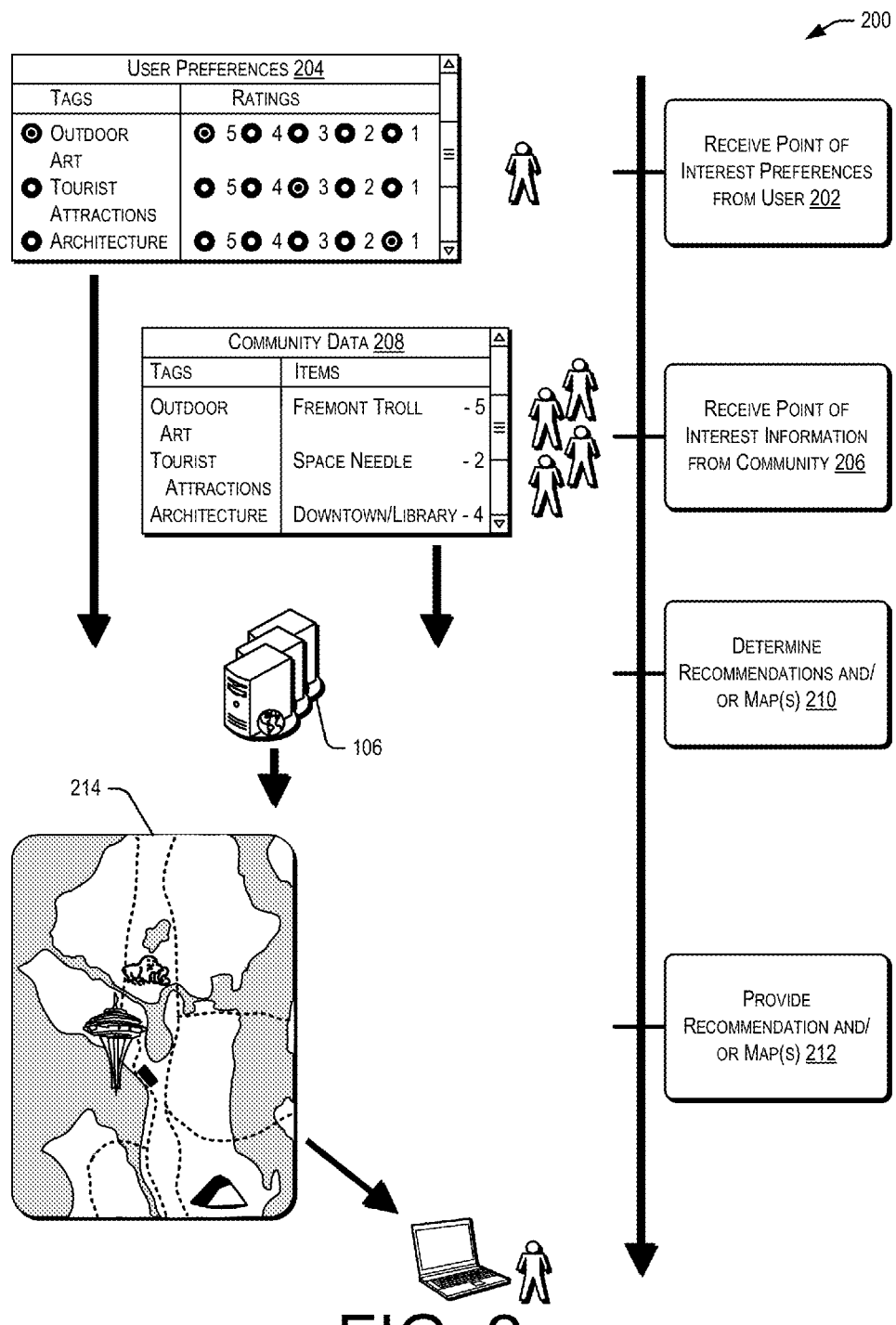
FIG. 2 illustrates an example flow for providing points of interest recommendations and/or mapping, according to at least one example.

FIG. 2 depicts an illustrative flow 200 in which techniques for providing point of interest recommendations and/or mapping may be implemented. In illustrative flow 200, operations may be performed by one or more processors of one or more point of interest computers 106, such as those described in FIG. 1. Additionally, instructions for performing the operations may be stored in one or more memories of the point of interest computers 106. As desired, the flow 200 may begin at 202, where the point of interest computers 106 may receive point of interest preferences from a user. In one non-limiting example, the point of interest preferences may be received from the user via a remote computing device or other computing device of the user. Additionally, by way of example only, the point of interest preferences may include a rating of one or more point of interest tags, point of interest categories, point of interest items, or the like. For example, as shown in the example user preferences user interface (UI) 204, a user may provide ratings (e.g., 1 through 5, or any other range) of preselected tags (e.g., outdoor art, tourist attractions, architecture, etc.). In this example, the user has rated outdoor art a 5 (the highest ranking in this example), tourist attractions a 4, and architecture a 1. Further, this preference information may be utilized by the point of interest computers 106 to generate a user profile for the user.

Additionally, in some examples, at 206, the point of interest computers 106 may receive point of interest information from one or more users of a community of users. The community of users may be a group or subset of users of the point of interest computers 106 and/or point of interest services provided by the point of interest computers 106 or other service provider. Additionally, the first user (i.e., the one that entered preferences at 202) may be part of the community. This point of interest information that is received from the community may include new point of interest tags, new point of interest items, pictures of point of interest items, indications of visits to point of interest items, ratings of point of interest tags, ratings of point of interest items, and/or ratings of point of interest item-tag associations. Additionally, the received point of interest information may be collected or otherwise combined to make up a data set of community data 208. For example, and as shown in FIG. 2, the community data 208 may include point of interest tags and, for each tag, one or more associated point of interest items. Additionally, the community data 208 may include ratings, such as that shown in FIG. 2 that correspond to a rating of a point of interest item, a point of interest tag, and/or a point of interest association.

At 210, the point of interest computers 106 may determine point of interest recommendations and/or maps. In some examples, the determination may be based at least in part on a user profile of the first user (e.g., generated based at least in part on the received user preferences) and the point of interest information received from the community. As noted, different factors may effect or influence the determination, e.g., how similar the first user's profile is to other community members' profiles, whether, and if so how, a user's profile has changed over time (e.g., based at least in part on ratings provided by that user and/or actual visits to point of interest items), and/or how a user rates point of interest items once visited. Further, in some examples, the point of interest computers 106 may provide the determined recommendation and/or map (e.g., the map 212) to the user device for display to a user at 214. In some cases, the user may be the same user that provided the user preferences 204 at 202. However, in other cases, the recommendations and/or map (s) may be provided to a different user. Additionally, the same user (or different users) may provide the user preferences 204 at 202 and/or receive the recommendations and/or map(s) at different user devices.

Figure 3:
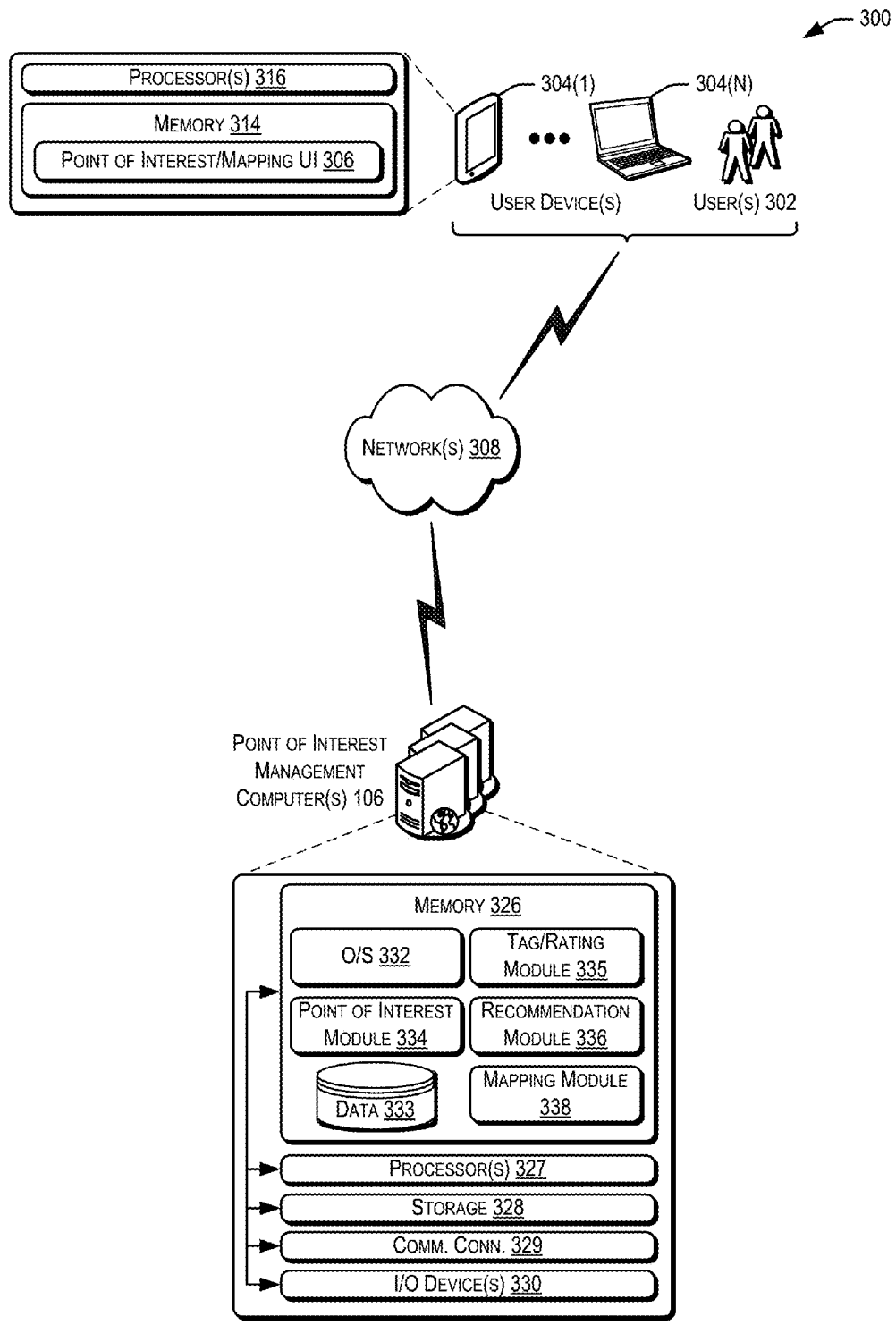
FIG. 3 illustrates an example architecture for providing points of interest recommendations and/or mapping as described herein that includes point of interest management computers and/or one or more user devices connected via one or more networks, according to at least one example.

FIG. 3 depicts an illustrative system or architecture 200 in which techniques for providing point of interest recommendations and/or mapping may be implemented. In architecture 200, one or more users 302 (i.e., account holders or web browser users) may utilize user computing devices 304(1)-(N) (collectively, user devices 304) to access an application 306 (e.g., a web browser), a user account accessible through the application 306, or a point of interest/mapping UI accessible through the application 306, via one or more networks 308. In some aspects, the application 306 and/or user account may be hosted, managed, and/or provided by a computing resources service or service provider, such as by utilizing one or more service provider computers and/or one or more point of interest management computers 106. The one or more point of interest management computers 106 may, in some examples, provide computing resources such as, but not limited to, client entities, low latency data storage, durable data storage, data access, management, virtualization, cloud-based software solutions, point of interest information management, etc. In some aspects, a client entity may be deployed and/or managed virtually and/or data volumes may be stored virtually within a distributed computing system operated by the one or more point of interest management computers 106. The one or more point of interest management computers 106 may also be operable to provide web hosting, computer application development, and/or implementation platforms, combinations of the foregoing, or the like to the one or more users 302. The one or more point of interest management computers 106, in some examples, may provide point of interest information management including, but not limited to, determining and/or providing point of interest recommendations tailored to user and in some examples, based at least in part on ratings provided by a community of users. Additionally, in some examples, the point of interest management computers 106 may also provide customized or tailored maps and/or directional routes for driving, walking, cycling, or otherwise getting to natural and/or man-made landmarks.

In some examples, the networks 308 may include any one or a combination of many different types of networks, such as cable networks, the Internet, wireless networks, cellular networks and other private and/or public networks. While the illustrated example represents the users 302 accessing the application 306 over the networks 308, the described techniques may equally apply in instances where the users 302 interact with the point of interest management computers 106 via the one or more user devices 304 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 306 may allow the users 302 to interact with a service provider computer, such as to access web content (e.g., web pages, music, video, etc.) and/or point of interest information (e.g., landmarks, structures, natural features, etc. and/or ratings or categories of the same). The one or more point of interest management computers 106, perhaps arranged in a cluster of servers or as a server farm, may host the application 306 and/or cloud-based software services. Other server architectures may also be used to host the application 306 and/or cloud-based software services. The application 306 may be capable of handling requests from many users 302 and serving, in response, various user interfaces that can be rendered at the user devices 304 such as, but not limited to a point of interest UI, a mapping UI, or the like. The application 306 can provide any type of website that supports user interaction, including social networking sites, online retailers, informational sites, blog sites, search engine sites, news and entertainment sites and so forth. As discussed above, the described techniques can similarly be implemented outside of the application 306, such as with other applications running on the user devices 304.

As noted above, the architecture 300 may include one or more user devices 304. The user devices 304 may be any type of computing device such as, but not limited to, a mobile phone, a smart phone, a personal digital assistant (PDA), a laptop computer, a desktop computer, a thin-client device, a tablet PC, etc. In some examples, the user devices 304 may be in communication with the point of interest management computers 106 via the networks 308, or via other network connections.

In one illustrative configuration, the user devices 304 may include at least one memory 314 and one or more processing units (or processor(s)) 316. The processor(s) 316 may be implemented as appropriate in hardware, computer-executable instructions, firmware, or combinations thereof. Computer-executable instruction or firmware implementations of the processor(s) 316 may include computer-executable or machine-executable instructions written in any suitable programming language to perform the various functions described. The user devices 304 may also include geo-location devices (e.g., a global positioning system (GPS) device or the like) for providing and/or recording geographic location information associated with the user devices 304.

The memory 314 may store program instructions that are loadable and executable on the processor(s) 316, as well as data generated during the execution of these programs. Depending on the configuration and type of user device 304, the memory 314 may be volatile (such as random access memory (RAM)) and/or non-volatile (such as read-only memory (ROM), flash memory, etc.). The user device 304 may also include additional removable storage and/or non-removable storage including, but not limited to, magnetic storage, optical disks, and/or tape storage. The disk drives and their associated computer-readable media may provide non-volatile storage of computer-readable instructions, data structures, program modules and other data for the computing devices. In some implementations, the memory 314 may include multiple different types of memory, such as static random access memory (SRAM), dynamic random access memory (DRAM), or ROM.

Turning to the contents of the memory 314 in more detail, the memory 314 may include an operating system and one or more application programs or services for implementing the features disclosed herein including at least the point of interest/mapping UI, such as via the web browsers 306 or dedicated applications (e.g., smart phone applications, tablet applications, etc.). The point of interest/mapping UI 306 may be configured to receive, store and/or display a website or other interface for interacting with the point of interest management computers 106. Additionally, the memory 314 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user 302 provided response to a security question or a geographic location obtained by the user device 304.

Additionally, in some aspects, the point of interest/mapping UI 306 may allow a user 302 to interact with the point of interest management computers 106. As such, the point of interest/mapping UI 306 may be utilized by the user 302 to enter or otherwise provide point of interest preferences (e.g., at setup or at any point in time when a user decides to update or change his or her profile), point of interest ratings, and/or point of interest item-category associations. Additionally, the point of interest/mapping UI 306 may also allow a user 302 to review or otherwise consume content from the point of interest management computers 106 (e.g., point of interest recommendations and/or point of interest maps). Further, in some examples, the point of interest/mapping UI 306 may be configured to provide profile pages for users, locations, point of interest items, and/or point of interest tags (i.e., categories). For example, a profile page may exist that can display all or some data associated with that profile. In one non-limiting example, a user profile page may list the user's preferences, point of interest items the user has rated, point of interest items the user has visited, how long the user visited each item visited, etc. Point of interest item profile pages and the like may show similarly associated data, as desired.

In some aspects, the point of interest management computers 106 may also be any type of computing devices such as, but not limited to, mobile, desktop, thin-client and/or cloud computing devices, such as servers. In some examples, the point of interest management computers 106 may be in communication with the user devices 304 and/or other service providers via the networks 308, or via other network connections. The point of interest management computers 106 may include one or more servers, perhaps arranged in a cluster, as a server farm, or as individual servers not associated with one another. These servers may be configured to perform the provisioning of point of interest recommendations and/or point of interest mapping as part of an integrated, distributed computing environment.

In one illustrative configuration, the point of interest management computers 106 may include at least one memory 326 and one or more processing units (or processor(s)) 327. The processor(s) 327 may be implemented as appropriate in hardware, computer-executable instructions, firmware, or combinations thereof. Computer-executable instruction or firmware implementations of the processor(s) 327 may include computer-executable or machine-executable instructions written in any suitable programming language to perform the various functions described.

The memory 326 may store program instructions that are loadable and executable on the processor(s) 327, as well as data generated during the execution of these programs. Depending on the configuration and type of point of interest management computers 106, the memory 326 may be volatile (such as RAM) and/or non-volatile (such as ROM, flash memory, etc.). The point of interest management computers 106 or servers may also include additional storage 328, which may include removable storage and/or non-removable storage. The additional storage 328 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 326 may include multiple different types of memory, such as SRAM, DRAM, or ROM.

The memory 326, the additional storage 328, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 326 and the additional storage 328 are all examples of computer storage media. Additional types of computer storage media that may be present in the point of interest management computers 106 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the point of interest management computers 106. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The point of interest management computers 106 may also contain communications connection(s) 229 that allow the point of interest management computers 106 to communicate with a stored database, another computing device or server, user terminals and/or other devices on the networks 308. The point of interest management computers 106 may also include I/O device(s) 330, such as a keyboard, a mouse, a pen, a voice input device, a touch input device, a display, speakers, a printer, etc.

Turning to the contents of the memory 326 in more detail, the memory 326 may include an operating system 332, one or more data stores 333, and/or one or more application programs or services for implementing the features disclosed herein including a point of interest module 334, a tag/rating module 335, a recommendation module 336, and/or a mapping module 338. In some examples, the point of interest module 334 may be configured to manage point of interest information including, but not limited to, a list or collection of all possible point of interest items (e.g., each landmark that may be visited). When a user 302 enters a new point of interest item into the system, the point of interest module 334 may be configured to store that item in the data store 333 or other storage location. Additionally, the point of interest module 334 may be configured to manage actual (i.e., physical) locations associated with each point of interest item. For example, the physical location may include an address, a city, a neighborhood, longitude and latitude coordinates, or the like. Further, in some examples, the point of interest module 334 may be configured to generate, manage, or otherwise store in the data store 333 (or other local or remote storage device) user profile information. For example, user profile information may include initial or updated (e.g., based at least in part on input from the user, machine learning, or actions taken by the user) user preferences, a profile score, and/or a profile category (e.g., profile scores may be used to categorize profiles including, but not limited to, single tag/factor categories and/or complex multi-factor categories).

In some examples, the tag/rating module 335 may be configured to enable users to provide one or more tags (e.g., to describe point of interest categories) and/or one or more ratings. As noted, each tag may be associated with multiple different point of interest items and each point of interest item may be associated with multiple tags. Additionally, in some aspects, users may enter tags in a free form manner in order to create new tags that did not previously exist. As noted, the user-provided tags may be normalized in order to lessen naming deviations. For example, if a user is attempting to create a new tag titled "weird outdoor sculptures" and a tag already exists titled "weird outdoor art," the tag/rating module 335 may suggest that the user name the new tag "weird outdoor art" (or at least indicate that this tag already exists) or the tag/rating module 335 may create the new tag and associate the two tags so that they reference the same data. In other words, users associating items with or rating either tag will actually be entering data for the same tag even though the two tags look distinct by name.

In at least one non-limiting example, one or more users with accounts (e.g., associated with the community) may visit a new city, town, or area and, while visiting the new area, may encounter one or more landmarks. For example, a user may visit Seattle (regardless of whether they've been there before or whether or not they live there) and go to the Space Needle. The user may then access the point of interest management computers 106 via a user device 304 and perform one or more of several possible actions. For example, the user may check in or otherwise indicate that they are currently at a point of interest item (i.e., the Space Needle), the user may rate the point of interest item, the user may generate one or more tags associated with this point of interest item (e.g., architecture, Worlds Fair, tower, viewpoint, icon, Seattle, tourist trap, historical, etc.), and/or the enter the point of interest item as a new item in the system. Further, in some examples, the tag/rating module 335 may also be configured to receive ratings of a point of interest item, a point of interest item with respect to a category (e.g., each association for a single point of interest item may be rated), and/or point of interest tags themselves. The tag/rating module 335 may also be configured to receive check-in information and/or pictures utilized to verify that the user actually visited the point of interest item or to weight a rating (e.g., point of interest items that are visited may be given greater weight during the recommendation/mapping stage than point of interest items that are just rated from afar). The tag/rating module 335 may also be configured to provide to a user the number of users that tagged each particular point of interest item with which particular tags. For example, a user may be able to view that 10 people tagged the Space Needle as "touristy," while 100 people tagged it as "interpretive."

The recommendation module 336 may be configured, in some examples, to determine appropriate point of interest recommendations for users of the system. For example, the recommendation module 336 may recommend a point of interest item and/or a point of interest tag to a user or a group of users. In some cases, the determined recommendations may be based at least in part on the user preferences (or a group profile generated by combining or averaging a group of user profiles), the community provided ratings, the community provided tags, and/or other user ratings with profiles similar to the user to whom the recommendation is being determined for. For example, a user may have indicated that they prefer weird outdoor art during a setup stage or, over time, the tag/rating module 335 may have received a large number of high ratings or check-ins (in relation to other ratings or check-ins for other items or tags). As such, weird outdoor art may be randomly recommended to the user whenever they are near particularly high rated items of that category. In some examples, the user may be enabled to set configurations for the recommendations. For example, the user may indicate that they would like to receive weird outdoor art recommendations at a time after a user with a similar profile rates an item of that category above a 4 out of 5, above an 9 out of 10, or the like. Similarly, the user may configure the system to notify them (i.e., provide recommendations) whenever he or she is within a certain distance from items of a category that are above a certain rating. As such, a user's geolocation information may be provided to the recommendation module 336 on a periodic basis in order for this information to be utilized by the determination step.

Additionally, as noted, in some examples, point of interest items may be recommended to users based at least in part on the ratings they (or other users) have provided, based at least in part on actual visits by the rating users, and/or based at least in part on how long a rating user has visited the item. For example, if users only visit an item for a short amount of time (e.g., identified by the geolocation information, associated time stamps, and/or a notification of when a user arrives and departs from a particular location), the weight given to the ratings provided may be less than the weight given to ratings provided for items where users stay for a longer period of time when visiting. Further, the recommendation module 336 may also be configured to provide the determined point of interest item recommendations to the users (e.g., via the point of interest/mapping UI 306 of a user device 304.

In some examples, the mapping module 338 may be configured to provide several different types of maps and/or mapping functionality including, but not limited to, maps of point of interest item recommendations, maps of point of interest items within a city, region, or map view, driving directions (i.e., map routes) to or from point of interest items and/or recommendations, and/or a playlist or itinerary of driving directions for a particular user, particular geographic area, particular amount of time, etc. By way of example only, a user may utilize a mapping application and/or the point of interest management computers 106 to get directions from point A to point B. As such, the mapping module 338 may be configured to provide point of interest item recommendations that are on the route, near the route, above a certain rating threshold, preferred by the user based at least in part on his or her profile, etc. The user may be enabled to set thresholds, favorite tags, favorite items, etc. for indicating what they would like to be notified about on their route. In some cases, the mapping module 338 may notify the user of point of interest items they will pass on their current route, items above a certain threshold (e.g., configured by the user) that are on the route, favorites that are on the route, a window of driving deviation that would be needed to visit an item not directly on the route, and/or items within a particular geofence (e.g., configured by the user) based at least in part on the surrounding roads and/or traffic.

Additionally, in some aspects, the mapping module 338 may provide a map listing point of interest items that were recommended by the recommendation module 336. For example, a map may be provided with relevant point of interest items marked on the map so it clear where each is located relative the user and each other. The mapping module 338 may also be configured to provide a playlist, itinerary, or other vacation plan for a traveler that is not familiar with a city and would like to see as many landmarks/attractions as possible. As such, the user (or a group of users) may be enabled to configure the mapping module with an amount of time the user has to sightsee, one or more modes of transportation (e.g., a private vehicle, public transportation, cycling, walking, etc.), and/or a set of tags, items, and/or rating preferences. Based at least in part on this information, the mapping module 338 may be configured to generate an itinerary including, but not limited to, directions to each item, an optimal order of visitation, and/or how long to stay at each point of interest item. Additionally, the total or average amounts of time that users typically stay at the point of interest items may be utilized as a factor in determining the itinerary. For example, if a user indicates that the playlist should only last for 4 hours, and one item is usually visited for 5 hours, that point of interest item would not be included into the itinerary. The directions may be provided such that the users may follow them using the mode of transportation requested or they may select to change the mode of transportation, in which case, the direction set may be updated by the mapping module 338, as desired.

Further, in some examples, the mapping module 338 may be configured to provide random trip recommendations, trip plans provided or otherwise configured by users (which may get their own tags—e.g., a tag for the trip), major point of interest item trips, trips based at least in part on a group profile (e.g., one that takes multiple user profiles into account to maximize the number of satisfied users). Additional features of the mapping module 338 may include, but are not limited to, parking locations during the trip, subway routes for visiting point of interest items, recommended visiting times (e.g., based at least in part on when certain items or areas of town are typically busy), toll road charges, point of interest item entrance fees, and/or how long users typically visit each point of interest item. Further, utilizing the point of interest item recommendations, the point of interest maps, and/or a user's geolocation information, A-B testing may be performed by at least one module of the point of interest management computers 106 (e.g., the point of interest module 334) to determine whether a user actually prefers items and/or categories that they indicate as preferred and/or whether a user actually visits the point of interest items that are recommended to him or her. For example, different point of interest item recommendation algorithms may generate different recommended items. By comparing a user's actual item visits and/or an amount of time for such visits with a set of recommendations, an optimal or preferred recommendation algorithm may be determined or otherwise selected. Future recommendations may then be based at least in part on the optimal recommendation algorithm.

A few additional examples of the operations of the point of interest management computers 106 are also described in greater detail below with reference to FIGS. 4-12.

Figure 4:
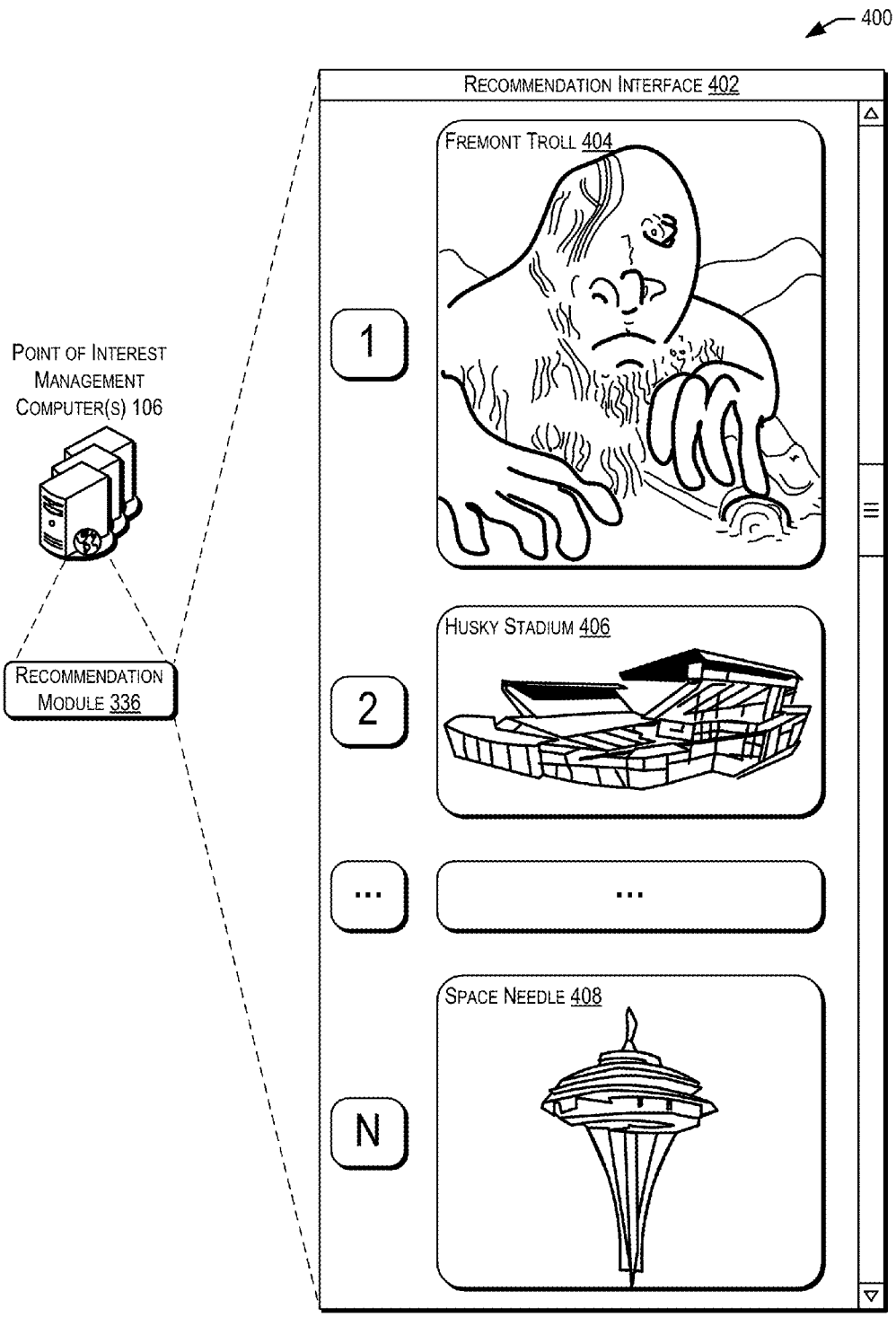
FIG. 4 illustrates an example block diagram for describing features of the point of interest recommendations described herein, according to at least one example.

FIG. 4 depicts an example block diagram 400, for describing techniques and/or features for providing point of interest recommendations and/or mapping, as described herein. In some examples, as discussed above, one or more point of interest management computers 106 may be configured with a recommendation module 336 (as seen in FIG. 103). Additionally, in one non-limiting example, the recommendation module 336 may be configured to generate and/or provide a recommendation interface 402 (i.e., all or part of the point of interest/mapping UI 306 of FIG. 3). The recommendation interface 402, in some examples, may render or otherwise provide one or more point of interest item recommendations. As illustrated in FIG. 4, the recommendation interface 402 may provide a list of point of interest items and/or images associated with each point of interest item. Although not shown in FIG. 4, the recommendation interface 402 may also render or otherwise provide other associated information adjacent or otherwise near the list and/or the images. Here, the recommendation interface illustrates 1-N point of interest item recommendations that may be determined by the recommendation module 336 based at least in part on a user profile and/or user ratings of items and/or tags. Here, the first point of interest item recommendation is illustrated as the Fremont Troll 404, the second item is Husky Stadium 406, and the last item is the Space Needle 408. In some examples, the order may be randomly or pseudo-randomly generated. However, in other examples, the order is based at least in part on a recommendation score (otherwise known as a match score) that may indicate a strength of the recommendation for the particular user. Recommendation scores may, in some examples, be determined as part of the recommendation determination process and may be based at least in part on several factors including, but not limited to, user preferences (i.e., the user profile), user ratings, community ratings, ratings of similar users, physical visits of items, or the like.

In some examples, the list may be sorted and/or filtered to provide the user with more customized information. Additionally, in some examples, images of the point of interest items may be displayed when a cursor is placed over the number. Additionally, as noted above, in some examples, the items may not be provided in any particular order. As such, the items may not even be provided in a list. In fact, the point of interest item recommendations may be provided in any visual format, as desired including, but not limited to, in a chart, as a graph, scattered across a page, in a row or column with no enumeration, etc. Items may also be resized or re-rendered to fit on a screen depending on the resolution and/or screen size of the user device being utilized to display the point of interest item recommendations.

Figure 5:
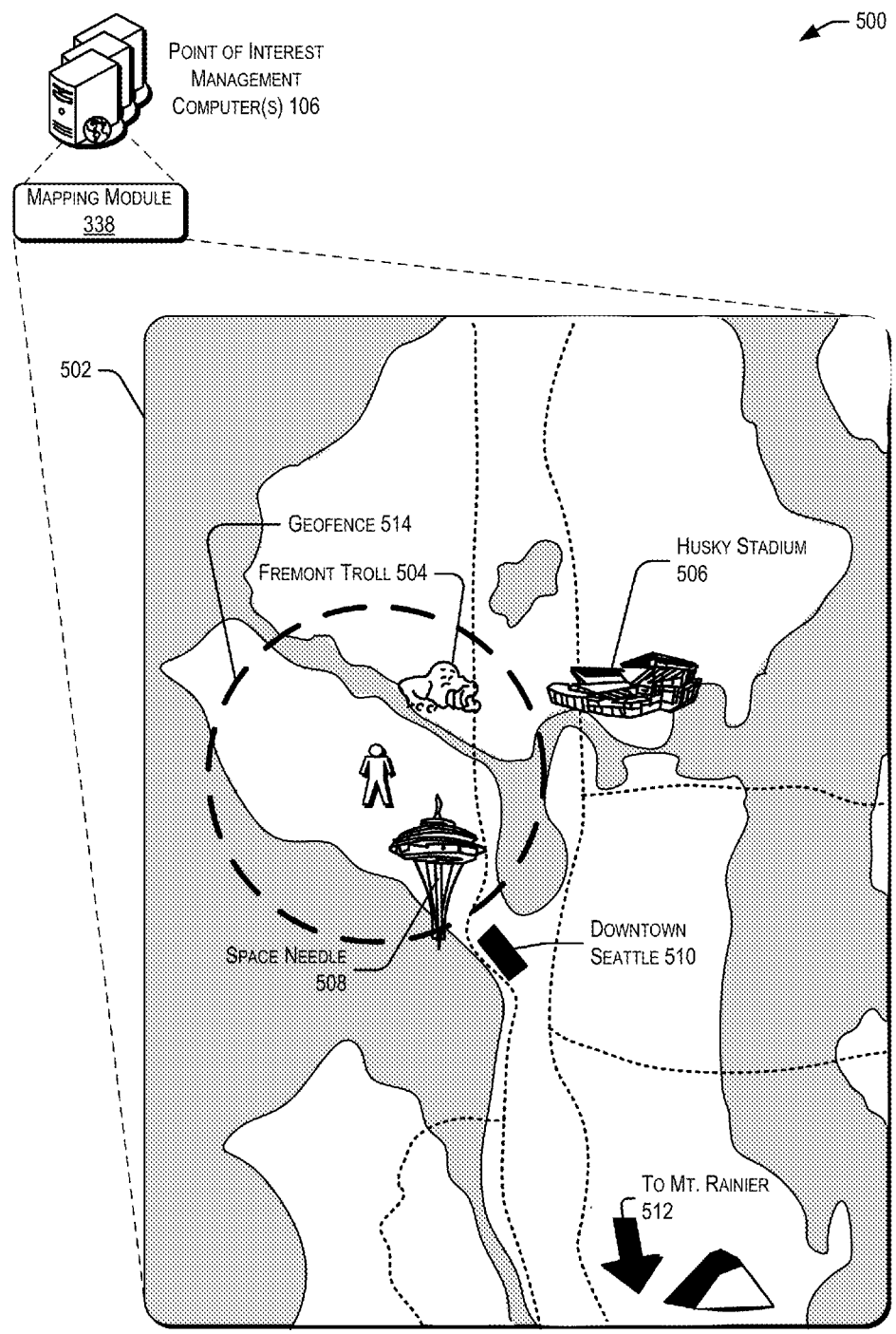
FIG. 5 illustrates an example block diagram for describing features of the point of interest mapping described herein, according to at least one example.

FIG. 5 depicts an example block diagram 500, for describing techniques and/or features for providing point of interest recommendations and/or mapping, as described herein. In some examples, as discussed above, one or more point of interest management computers 106 may be configured with a mapping module 338 (as seen in FIGS. 1-3). Additionally, in one non-limiting example, the mapping module 338 may be configured to generate and/or provide a map interface 502. As noted above, in some examples, the map interface 502 may include point of interest items labeled or otherwise marked on a map of a particular city or geographic region. In this example, the map interface 502 illustrates Seattle, Wash. and a few common points of interest in and around Seattle, including the Fremont Troll 504, Husky Stadium 506, the Space Needle 508, Downtown Seattle 510, and Mount Rainer 512. In some examples, the point of interest items listed above, and illustrated in FIG. 5 may be provided by the mapping module 338 as general point of interest items in Seattle, top point of interest items in Seattle, and/or point of interest items in Seattle that match a user's profile and/or preferences. Further, in some examples, a geofence 514 or other boundary may be provided by the user to indicate a narrower scope of point of interest items to be displayed. In this example, the mapping module 338 may only display point of interest items within the geofence 514 or other boundary. For example, as illustrated in FIG. 5, only the Fremont Troll 504 and the Space Needle 508 may be displayed on the map interface 502 when the geofence 514 is implemented. Other variations and/or features may be utilized to provide point of interest items on a map, as desired.

Figure 6:
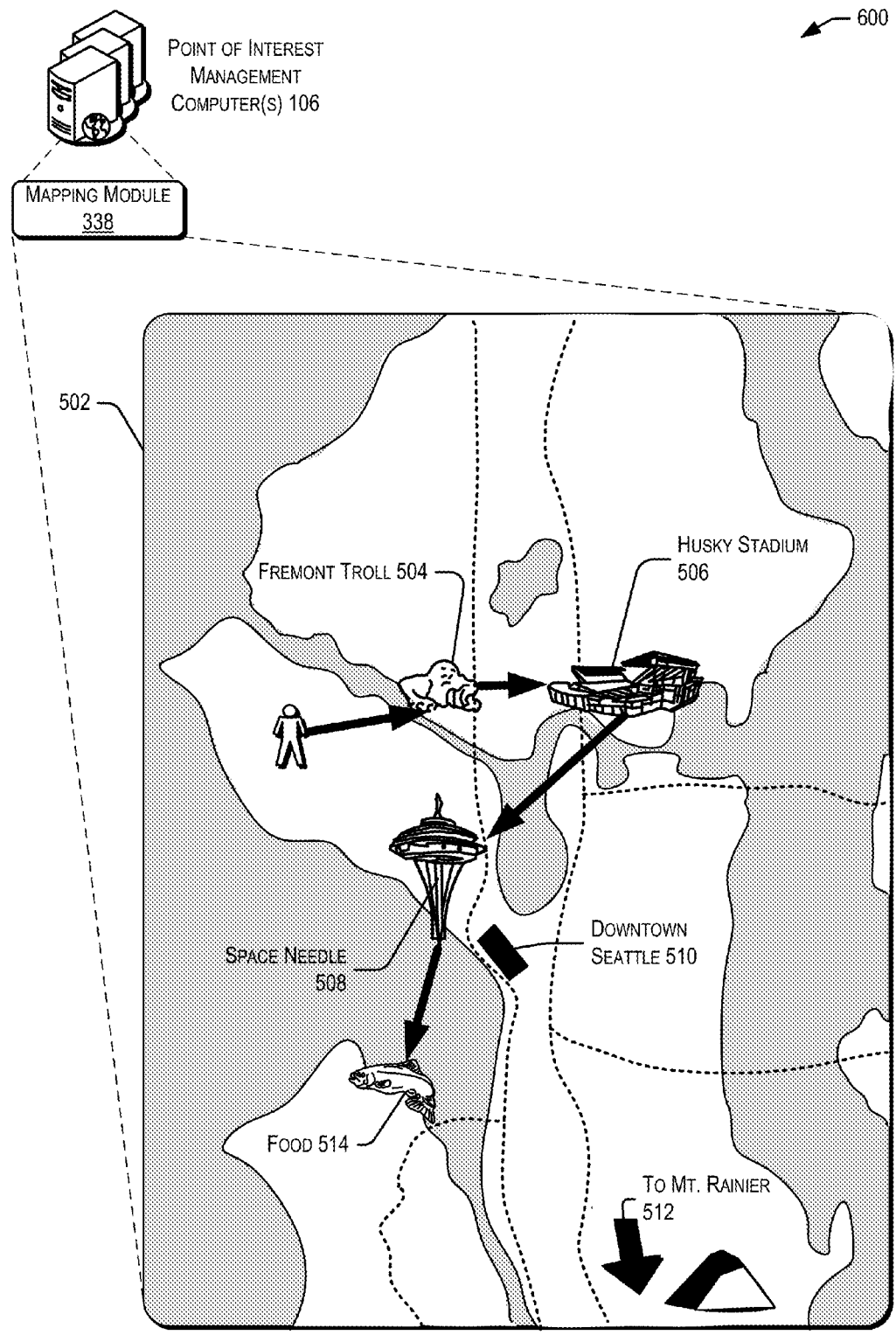
FIG. 6 illustrates an example block diagram for describing additional features of the point of interest mapping described herein, according to at least one example.

FIG. 6 depicts an example block diagram 600, for describing techniques and/or features for providing point of interest recommendations and/or mapping, as described herein. In some examples, as discussed above, one or more point of interest management computers 106 may be configured with a mapping module 338 (as seen in FIGS. 1-3). Additionally, as noted, in one non-limiting example, the mapping module 338 may be configured to generate and/or provide the map interface 502. As noted above, in some examples, the map interface 502 may include point of interest items labeled or otherwise marked on a map of a particular city or geographic region. In this example, the map interface 502 illustrates Seattle, Wash. and a few common points of interest in and around Seattle, including the Fremont Troll 504, Husky Stadium 506, the Space Needle 508, Downtown Seattle 510, Mount Rainer 512, and a seafood restaurant 514. Additionally, FIG. 6 illustrates the non-limiting example of providing the user with a route or set of directions (i.e., a travel guide) for visiting one or more of the point of interest items being recommended (in some examples, as recommended by the recommendation module 336 of FIG. 3). As shown here, the mapping module 338 may provide an ordered list of point of interest items to visit in an optimal order. For example, the route may indicate that the user should travel to the Fremont Troll 504 first, followed by traveling to Husky Stadium 506, the Space Needle 508, and then the seafood restaurant 512 in West Seattle. In some examples, the time of day may also be a factor in providing the route. For example, the restaurant 514 may be included at the end based at least in part on the fact that it may be dinner or lunch time during this part of the route. As desired, these types of enhancements may be configurable by the user (e.g., to configure when they prefer to eat lunch and/or dinner, how many miles they are willing to travel, how long they would like the route to be, and/or how much gas or money they would like to spend. As such, the entire experience of receiving custom point of interest item recommendations and associated maps and/or travel routes may be fully customizable.

FIGS. 7-12 illustrate example flow diagrams showing respective processes 700-1200 for providing point of interest recommendations and/or mapping, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 7:
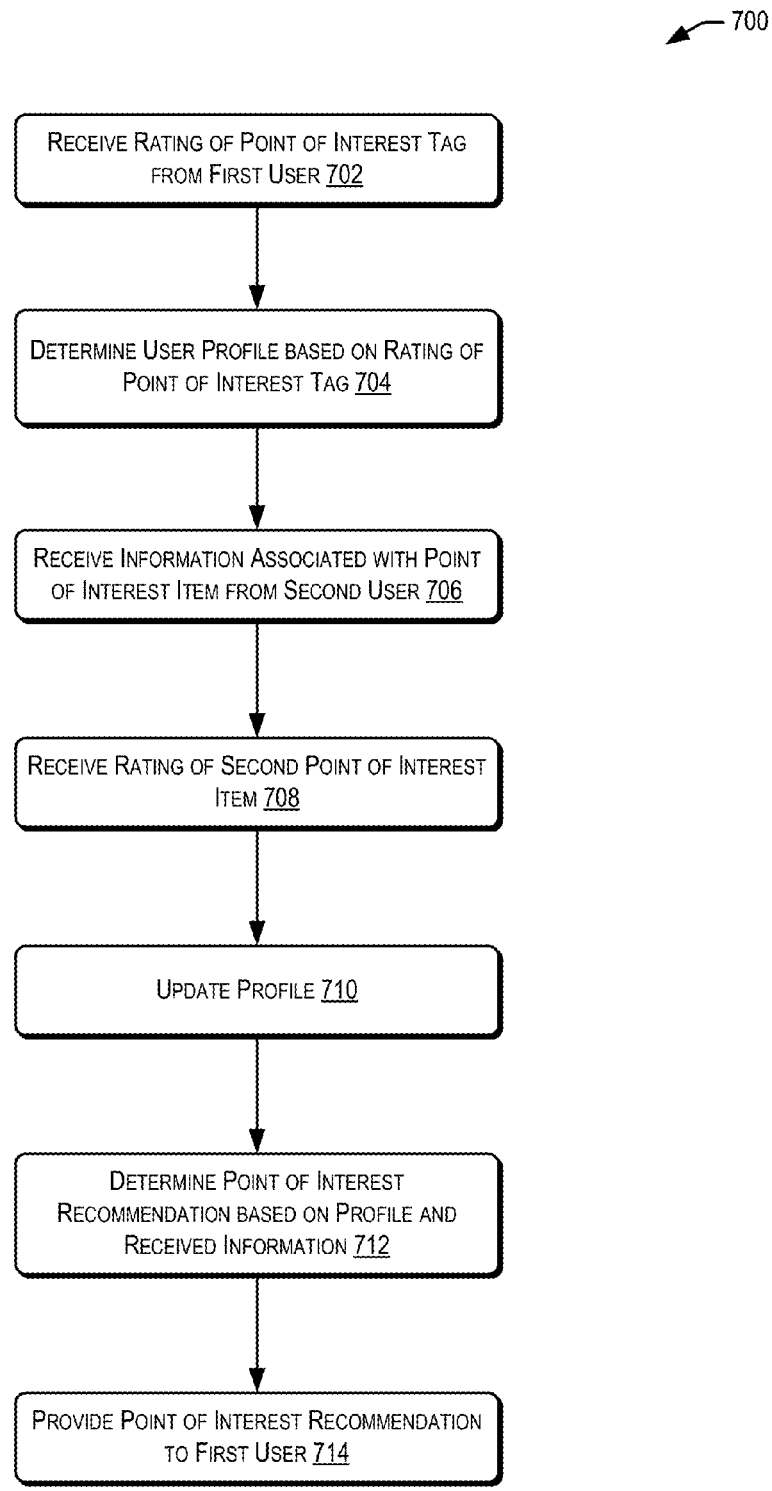
FIG. 7 illustrates an example flow diagram of a process for providing points of interest recommendations as described herein, according to at least one example.

In some examples, the one or more point of interest management computers 106 (e.g., utilizing at least the recommendation module 336) shown in FIG. 3 may perform the process 700 of FIG. 7. The process 700 may begin at 702 by receiving a rating of a point of interest tag from a first user. In some examples, this may be part of the initial setup process where a user is providing preferences that may be utilized to generate a user profile. At 704, the process 700 may include determining a user profile for the first user based at least in part on ratings provided that are associated with one or more point of interest tags. In some examples, the process 700 may also include receiving information associated with point of interest items from a second user at 706. The second user may be at least one of a community of users or members of a point of interest management system. At 708, the process 700 may include receiving a rating of a second point of interest item. In some cases, this rating is from the first user and is based at least in part on reviewing or visiting point of interest items. This may be separate from the setup process, where the first user entered preference information for setting up a profile. In this case, the rating of the second point of interest item is any rating by the first user and/or members of the community of raters. In some examples, based at least in part on the rating information received at 708, the process 700 may include updating the first user's profile. In other words, the first user's profile may be periodically updated based at least in part on ratings provided by that first user. At 712, the process 700 may include determining a point of interest recommendation based at least in part on the user profile of the first user and/or the received rating information. At 714, the process 700 may end by including providing the point of interest recommendation to the first user.

Figure 8:
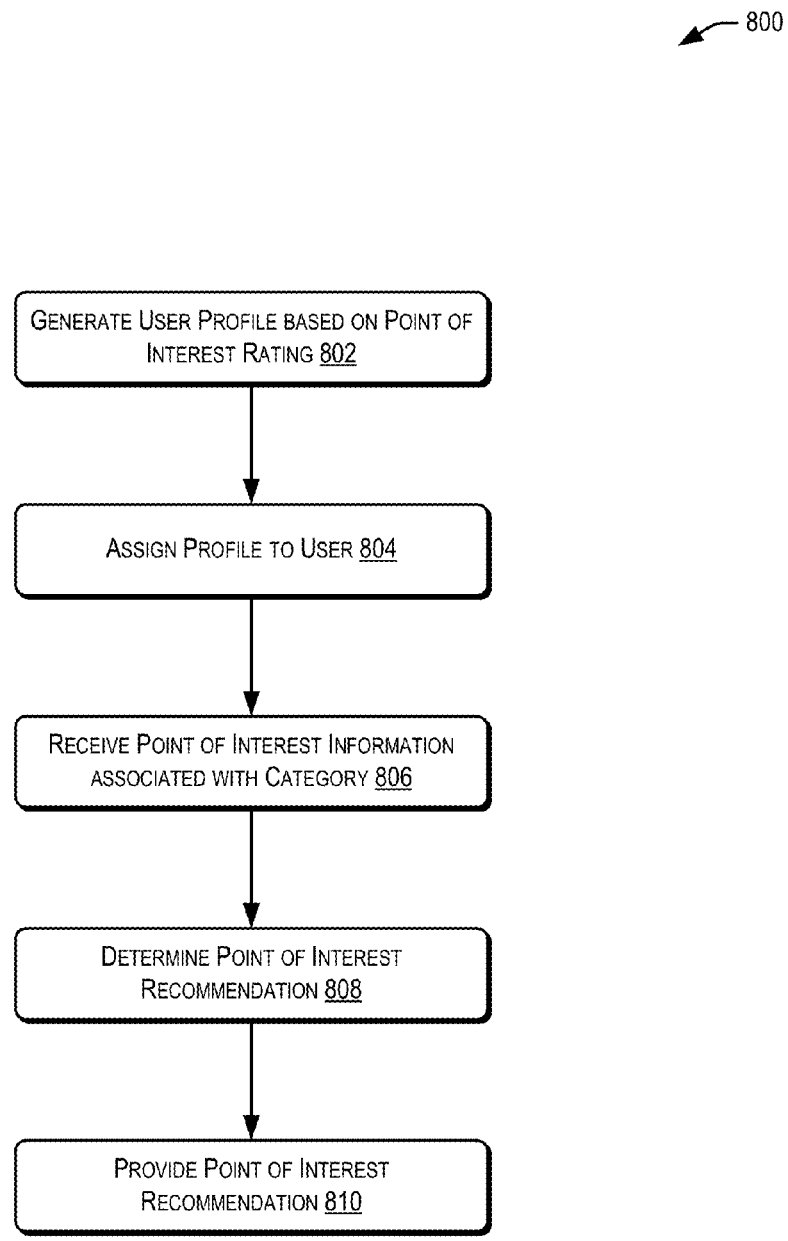
FIG. 8 illustrates another example flow diagram of a process for providing points of interest recommendations as described herein, according to at least one example.

FIG. 8 illustrates an example flow diagram showing process 800 for providing point of interest recommendations and/or mapping, according to at least a few examples. The one or more point of interest management computers 106 (e.g., utilizing at least the recommendation module 336) shown in FIG. 3 may perform the process 800 of FIG. 8. The process 800 may begin at 802 by including generation of a user profile based at least in part on point of interest ratings. For example, a user may rate or rank point of interest items and/or tags at a setup stage and/or during regular use of the system. As such, the users profile may be generated based at least in part on that information. The process 800 may also include assigning the profile to a particular user at 804. In some examples, at 806, the process 800 may include receiving point of interest information associated with a category (otherwise referred to as a tag). At 808, the process 800 may include determining a point of interest recommendation. The recommendation may include a point of interest item and/or a point of interest tag to be recommended to the user. The process 800 may end at 810, where the process 800 may include providing the point of interest recommendation (e.g., to the user).

Figure 9:
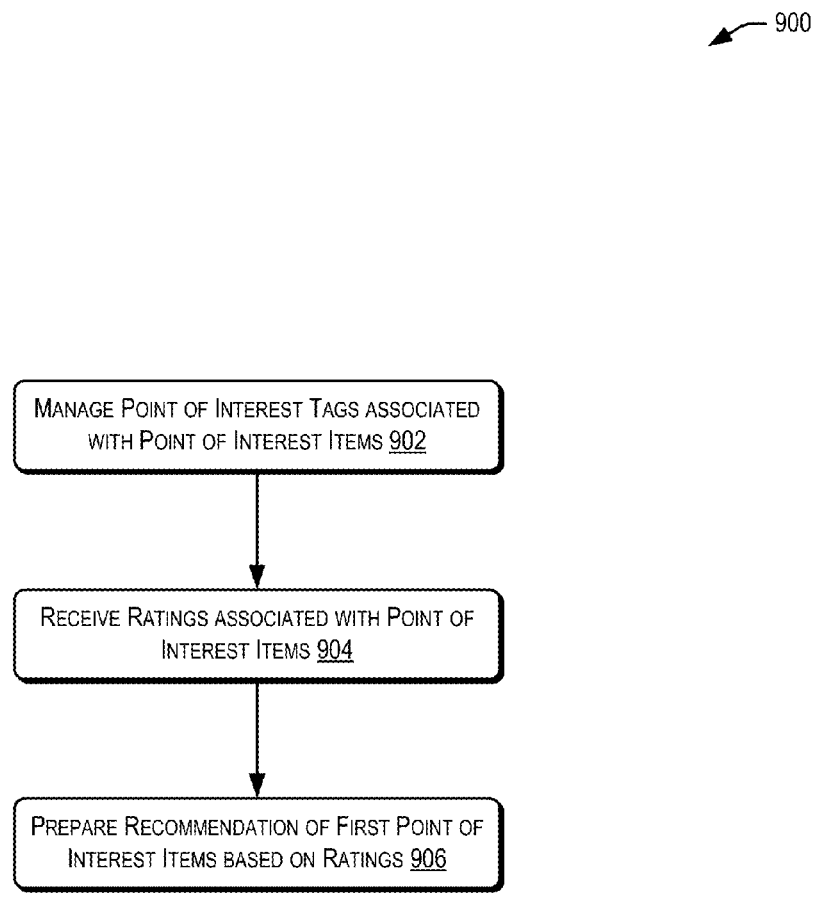
FIG. 9 illustrates another example flow diagram of a process for providing points of interest recommendations as described herein, according to at least one example.

FIG. 9 illustrates an example flow diagram showing process 900 for providing point of interest recommendations and/or mapping, according to at least a few examples. The one or more point of interest management computers 106 (e.g., utilizing at least the recommendation module 336) shown in FIG. 3 may perform the process 900 of FIG. 9. The process 900 may begin at 902 by including managing one or more point of interest tags associated with point of interest items. For example, a tag such as architecture may be associated with one or more particular point of interest items (e.g., the Seattle Public Library). At 904, the process 900 may include receiving ratings associated with one or more point of interest items. These ratings, in some examples, may be provided by one or more users or members of a community of rating entities. The process 900 may end at 906, where the process 900 may include preparing a recommendation of at least a first point of interest item based at least in part on the ratings received at 904 and/or a profile of a user.

Figure 10:
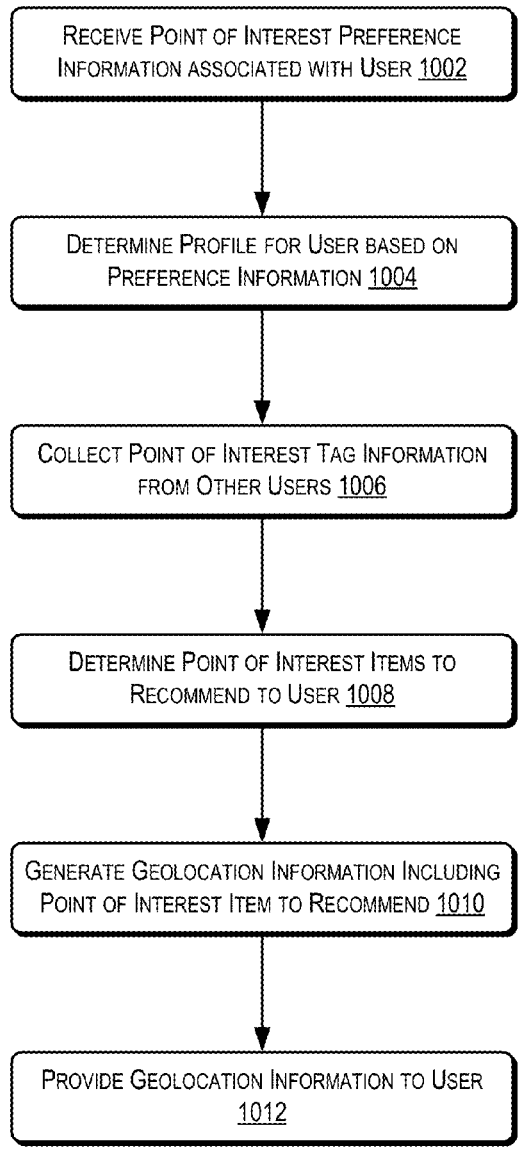
FIG. 10 illustrates an example flow diagram of a process for providing points of interest mapping as described herein, according to at least one example.

FIG. 10 illustrates an example flow diagram showing process 1000 for providing point of interest recommendations and/or mapping, according to at least a few examples. The one or more point of interest management computers 106 (e.g., utilizing at least the mapping module 338) shown in FIG. 3 may perform the process 1000 of FIG. 10. The process 1000 may begin at 1002 by including receiving point of interest preference information associated with a user. In this way, similar to that described above, the user may provide preferences that can be utilized to generate a profile for the user. The process 1000 may also include determining a profile for a user based at least in part on the received preference information at 1004. Additionally, at 1006, the process 1000 may include collecting point of interest tag information from other users. In some examples, this point of interest information may include ratings, tags, item-tag associations, or the like. At 1008, the process 1000 may include determining point of interest items to recommend to the user. This determination may be based at least in part on the user profile and/or the collected point of interest tag information. The process 1000 may also include generating geolocation information including at least the point of interest item to be recommended at 1010. The process 1000 may end at 1012, where the process 1000 may include providing the geolocation information to the user or to a mapping application.

Figure 11:
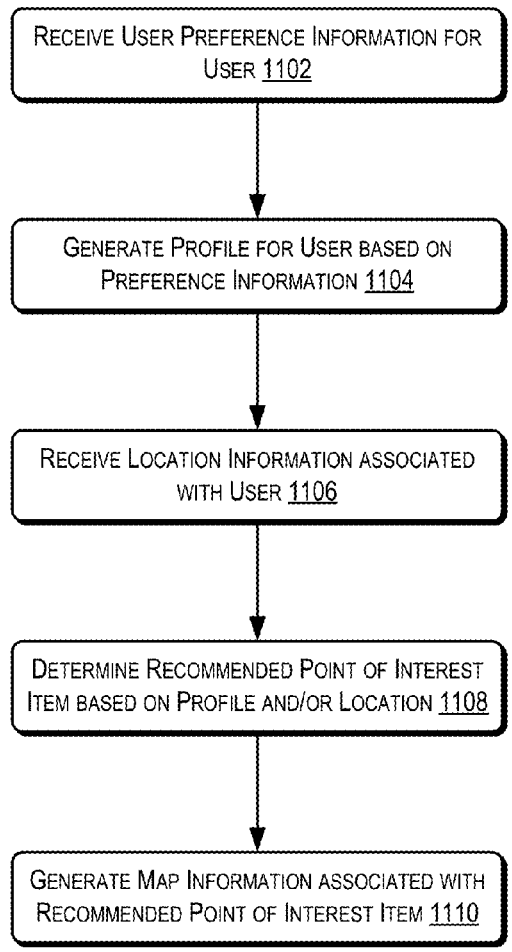
FIG. 11 illustrates another example flow diagram of a process for providing points of interest mapping as described herein, according to at least one example.

FIG. 11 illustrates an example flow diagram showing process 1100 for providing point of interest recommendations and/or mapping, according to at least a few examples. The one or more point of interest management computers 106 (e.g., utilizing at least the mapping module 338) shown in FIG. 3 may perform the process 1100 of FIG. 11. The process 1100 may begin at 1102 by including receiving preference information for a user. The preference information may include one or more ratings of point of interest tags or categories. At 1104, the process 1100 may include generating a profile for the user based at least in part on the preference information. The process 1100 may also include receiving location information associated with the user at 1106. In some examples, this location information may be provided from a mobile device or other computing device that includes geolocation features. At 1108, the process 1100 may also include determining recommended point of interest items based at least in part on the profile and/or the location of the user. At 1110, the process 1100 may end by including generation of map information associated with the recommended point of interest item. The generated map information may include a map or data points to be sent to a map application or the like.

Figure 12:
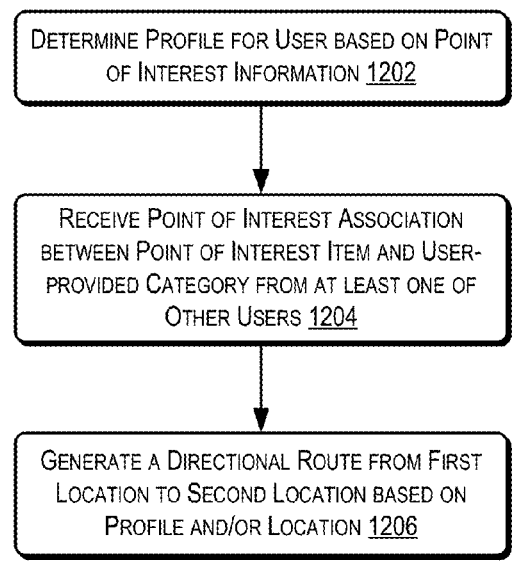
FIG. 12 illustrates another example flow diagram of a process for providing points of interest mapping as described herein, according to at least one example.

FIG. 12 illustrates an example flow diagram showing process 1200 for providing point of interest recommendations and/or mapping, according to at least a few examples. The one or more point of interest management computers 106 (e.g., utilizing at least the mapping module 338) shown in FIG. 3 may perform the process 1200 of FIG. 12. The process 1200 may begin at 1202 by including determination of a profile of a user based at least in part on point of interest information. This point of interest information may include preference information and/or ratings of tags and/or items. At 1204, the process 1200 may include receiving point of interest associations between a point of interest item and a user-provided category from at least one of a community of other users. The associations may include item-tag pairs such as, but not limited to, associating the Fremont Troll with a "weird outdoor art" tag. The process 1200 may end at 1206 by including generation of a directional route from a first location to a second location based at least in part on the determined profile and/or a location of the user.

Illustrative methods and systems for performing automated infrastructure configuration are described above. Some or all of these systems and methods may, but need not, be implemented at least partially by architectures such as those shown at least in FIGS. 1-12 above.

Figure 13:
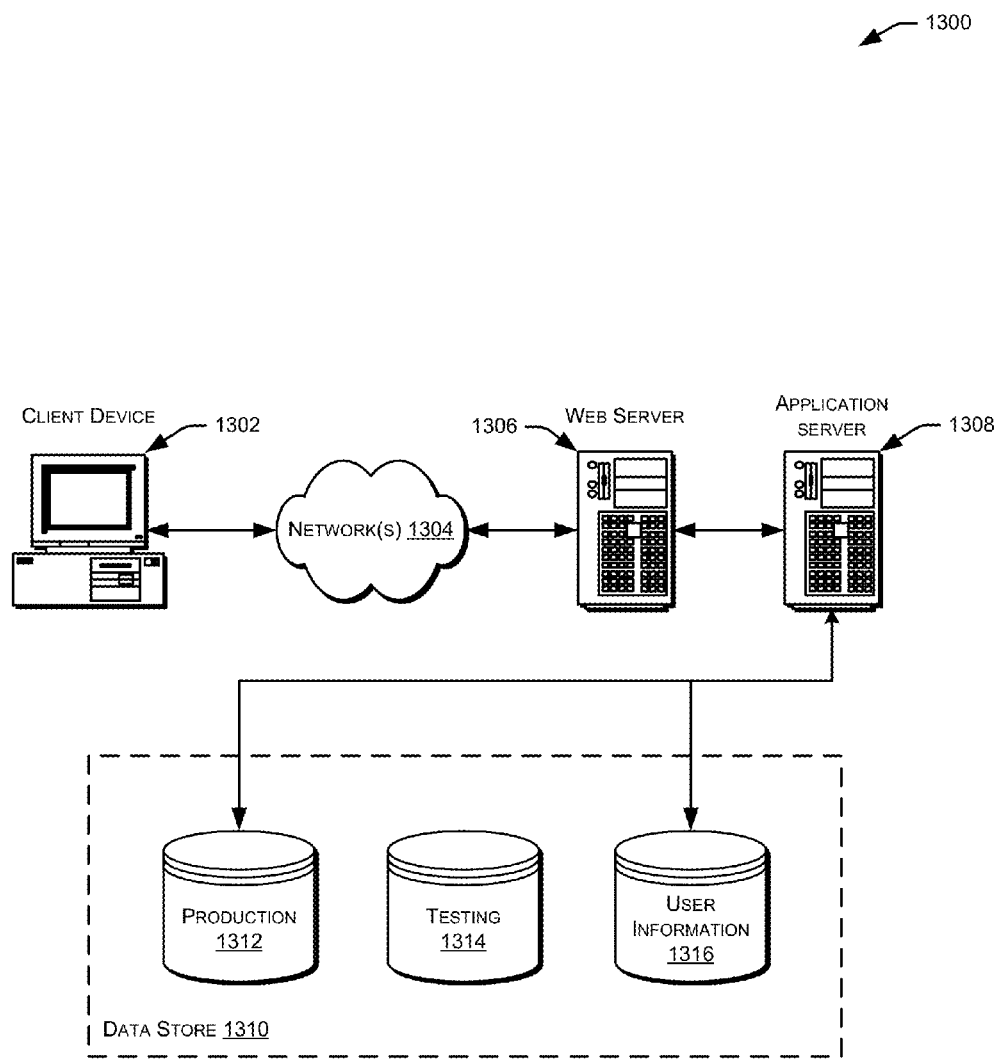
FIG. 13 illustrates an environment in Which various embodiments of providing points of interest recommendations and/or mapping as described herein can be implemented, according to at least one example.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing points of interest mapping, comprising:
    under control of one or more processors configured with executable instructions for,
    receiving point of interest preference information associated with a first user, wherein the point of interest preference information includes at least a user-defined rating of a user-defined category, the user-defined category being assigned a categorization based at least in part on a physical characteristic associated with a point of interest in the user-defined category;
    determining, based at least in part on the point of interest preference information, a profile for the first user;
    collecting, from a plurality of other users, other point of interest preference information;
    determining, based at least in part on the profile of the first user and the point of interest preference information associated with the first user, one or more point of interest items to recommend to the first user;
    generating geolocation information including at least the one or more point of interest items to recommend; and
    providing at least the geolocation information to the first user.

2. The computer-implemented method of claim 1, wherein the point of interest preference information is received from the first user during a setup phase.

3. The computer-implemented method of claim 2, wherein the profile of the first user is updated based at least in part on additional point of interest information received after the setup phase.

4. The computer-implemented method of claim 3, wherein the additional point of interest information includes at least one of a rating, a tag, or geolocation information.

5. The computer-implemented method of claim 1, wherein the one or more point of interest items include at least one of a structure or a landmark.

6. A computer-implemented method for managing points of interest mapping, comprising:
    under control of one or more processors configured with executable instructions for,
    receiving user preference information for a user, the user preference information including at least a user-generated rating associated with a user-defined category, the user-defined category being assigned a categorization based at least in part on a physical characteristic associated with a point of interest in the user-defined category;
    generating a point of interest profile for the user based at least in part on the user-generated rating associated with the user-defined category of the user preference information;
    receiving location information associated with the user;
    determining a recommended point of interest item based at least in part on at least one of the point of interest profile or the location information; and
    generating map information associated with the recommended point of interest item.

7. The computer-implemented method of claim 6, wherein the rating indicates a level of interest, for the user, in the user-defined category.

8. The computer-implemented method of claim 6, wherein the rating indicates a level of agreement, by the user, with an association between the categorization of the user-defined category and an associated point of interest item.

9. The computer-implemented method of claim 6, wherein the determination of the recommended point of interest item is based at least in part on one or more user-defined categories received from additional users, one or more ratings of the user-defined categories, or one or more ratings of point of interest items.

10. The computer-implemented method of claim 6, wherein the map information includes at least one of a map associated with the recommended point of interest item or a route from a location associated with the location information of the user to the recommended point of interest item.

11. The computer-implemented method of claim 6, wherein the user preference information is received from the user during a setup phase.

12. The computer implemented method of claim 6, wherein generating the map information comprises generating a directional route from a first location associated with the user to at least a second location associated with the recommended point of interest item.

13. A system for managing points of interest mapping, comprising:
   at least one memory that stores computer-executable instructions; and
   at least one processor configured to access the at least one memory, wherein the at least one processor is configured to execute the computer-executable instructions to perform operations comprising:
   determine a point of interest profile for a user, the point of interest profile being based at least in part on user preference information including at least a rating associated with a user-defined category, the user-defined category being assigned a categorization based at least in part on a physical characteristic associated with a point of interest in the user-defined category;
   manage one or more user-defined categories received from one or more additional users of a plurality of users; and
   generate customized map information based at least in part on the point of interest profile of the user and the one or more user-defined categories.

14. The system of claim 13, wherein the one or more user-defined categories are associated with at least one of a rating of the one or more user-defined categories or a rating of a point of interest item associated with the one or more user-defined categories.

15. The system of claim 13, wherein the operations further comprise receiving a location of the user.

16. The system of claim 15, wherein the customized map information includes at least directions from the location of the user to a point of interest item recommended to the user based at least in part on the point of interest profile of the user.

17. The system of claim 13, wherein the operations further comprise determining a second point of interest profile for a second user.

18. The system of claim 15, wherein the customized map information includes at least directions from the location of the user to a point of interest item recommended to a group based at least in part on a group profile including at least the point of interest profile of the user and a second point of interest profile of a second user.

19. One or more non-transitory computer-readable media storing computer-executable instructions for managing points of interest mapping that, when executed by one or more computer systems, configure the one or more computer systems to perform operations comprising:
   determining a profile for a first user based at least in part on point of interest information, the point of interest information including at least a rating associated with a user-provided category, the user-provided category being assigned a categorization based at least in part on a physical characteristic associated with a point of interest in the user-provided category;
   receiving a point of interest association between a point of interest item and the user-provided category from one or more users of a plurality of users, at least one of the one or more users being different from the first user; and
   generating a directional route from a first location to at least a second location based at least in part on the profile of the first user and the point of interest association.

20. The one or more non-transitory computer-readable media of claim 19, wherein the user-provided category is received from the first user or from at least one user of the plurality of users.

21. The one or more non-transitory computer-readable media of claim 19, wherein the operations further comprise selecting an optimal algorithm for generating the directional route at a time before generating the directional route, the optimal algorithm selected based at least in part on an indication that the first user visited a previously recommended point of interest item.

22. The one or more non-transitory computer-readable media of claim 19, wherein the first location is based at least in part on a received location of the first user.

23. The one or more non-transitory computer-readable media of claim 19, wherein the second location is based at least in part on a geo-fence configured by the first user.

24. The one or more non-transitory computer-readable media of claim 19, wherein the directional route is configured based at least in part on an amount of time spent at each point of interest item on the directional route.

* * * * *